US012574800B2

(12) United States Patent
Smith et al.

(10) Patent No.: US 12,574,800 B2
(45) Date of Patent: Mar. 10, 2026

(54) FIFTH GENERATION (5G) AND Wi-Fi MULTI-ACCESS POINT COORDINATION FUNCTION

(71) Applicant: Cisco Technology, Inc., San Jose, CA (US)

(72) Inventors: Malcolm Muir Smith, Richardson, TX (US); Indermeet Singh Gandhi, San Jose, CA (US)

(73) Assignee: Cisco Technology, Inc.

( * ) Notice: Subject to any disclaimer, the term of this patent is extended or adjusted under 35 U.S.C. 154(b) by 622 days.

(21) Appl. No.: 17/816,773

(22) Filed: Aug. 2, 2022

(65) Prior Publication Data

US 2024/0049057 A1    Feb. 8, 2024

(51) Int. Cl.
*H04W 28/10* (2009.01)
*H04W 28/02* (2009.01)
*H04W 84/12* (2009.01)

(52) U.S. Cl.
CPC ....... *H04W 28/10* (2013.01); *H04W 28/0231* (2013.01); *H04W 84/12* (2013.01)

(58) Field of Classification Search
CPC . H04W 28/10; H04W 28/0231; H04W 84/12; H04W 28/086; H04W 28/0975; H04W 72/1263; H04W 72/1215; H04W 28/0278
See application file for complete search history.

(56) References Cited

U.S. PATENT DOCUMENTS 10,374,749 B1     8/2019 Kulkarni
2017/0041901 A1*  2/2017 Karaki .............. H04W 28/0865

2019/0037433 A1*  1/2019 Nagasaka ......... H04W 28/0252
2019/0335454 A1* 10/2019 Huang ................ H04W 72/542
2021/0051722 A1   2/2021 Huang et al.
2021/0112551 A1   4/2021 Anderson et al.
2021/0120548 A1   4/2021 Chen et al.
2021/0329500 A1* 10/2021 Cariou ................ H04W 74/002
(Continued)

FOREIGN PATENT DOCUMENTS

WO      2018118150 A1   6/2018
WO      2022132030 A1   6/2022

OTHER PUBLICATIONS

Chen Q., et al., "Spatial Multiplexing based NR-U and WiFi Coexistence in Unlicensed Spectrum", 2019 IEEE 90th Vehicular Technology Conference (VTC2019-FALL), IEEE, Sep. 22, 2019, pp. 1-5, XP033648547, Paragraph [001. ].

(Continued)

*Primary Examiner* — Ayaz R Sheikh
*Assistant Examiner* — Tarell A Hampton
(74) *Attorney, Agent, or Firm* — Merchant & Gould P.C.

(57) ABSTRACT

A Fifth Generation (5G) and Wi-Fi Multi-Access Point Coordination (MAPc) function may be provided. A MAPc processor may determine a first traffic flow and a second traffic flow for a User Equipment (UE) and a property of the first traffic flow and of the second traffic flow. The MAPc processor may schedule restricted Target Wake Time (rTWT) service intervals on a Wi-Fi AP for the first traffic flow, and the MAPc processor may schedule rTWT service intervals on a 5G AP for the second traffic flow. The rTWT service intervals on the Wi-Fi AP may be at different times than the rTWT service intervals on the 5G AP.

17 Claims, 4 Drawing Sheets

(56) References Cited

U.S. PATENT DOCUMENTS

| | | | |
|---|---|---|---|
| 2022/0022087 A1* | 1/2022 | Chu | H04W 28/0268 |
| 2022/0070772 A1* | 3/2022 | Ho | H04W 28/0236 |
| 2022/0109622 A1* | 4/2022 | Yeh | H04L 67/10 |
| 2023/0049192 A1* | 2/2023 | Ajami | H04W 52/0235 |
| 2023/0098250 A1* | 3/2023 | Wright | G01C 21/3407 |
| | | | 705/7.19 |
| 2023/0140312 A1* | 5/2023 | Ajami | H04W 74/0866 |
| | | | 370/329 |
| 2024/0098712 A1* | 3/2024 | Chitrakar | H04W 72/0446 |
| 2024/0292457 A1* | 8/2024 | Dong | H04W 72/0446 |

OTHER PUBLICATIONS

Gupta B., "802.11 WLAN and 3GPP 5G System Interworking", 11-20-1579-02-AANI-2020-10-13.-Tutorial-IEEE-802-11-And-3GPP-5G-System-Interworking, doc.: IEEE 802.11-20/1579r2, Tutorial at IEEE 802 Plenary, IEEE-SA Mentor, Piscataway, NJ USA, vol. 802.11 AANI, No. 2, Oct. 13, 2020, pp. 1-40, XP068173775, pp. 29,32,34.

International Search Report and Written Opinion for International Application No. PCT/US2023/071534 mailed Oct. 27, 2023, 17Pages.

Viger P., et al., "CR for Low-Latency BSR", IEEE, 11-21-1577-00-00BE-CR-For-Low-Latency-BSR, IEEE-SA, Mentor, Piscataway, NJ, USA, vol. 802.11 EHT, 802.11be, doc.: IEEE 802.11-21/1577r0, Oct. 14, 2021, pp. 1-12, XP068185432, pp. 2-7 ,9.

* cited by examiner

200

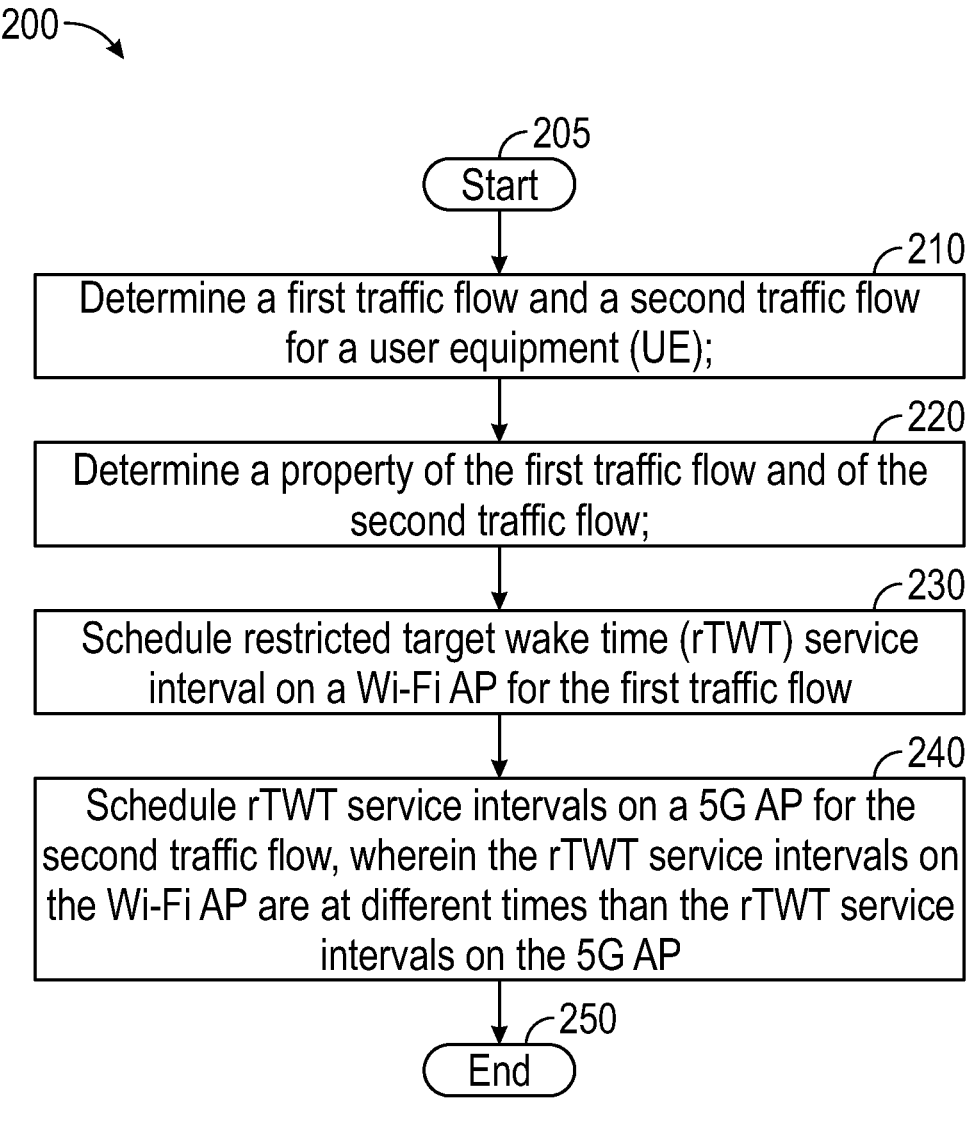

205
Start

210
Determine a first traffic flow and a second traffic flow for a user equipment (UE);

220
Determine a property of the first traffic flow and of the second traffic flow;

230
Schedule restricted target wake time (rTWT) service interval on a Wi-Fi AP for the first traffic flow 240
Schedule rTWT service intervals on a 5G AP for the second traffic flow, wherein the rTWT service intervals on the Wi-Fi AP are at different times than the rTWT service intervals on the 5G AP 250
End

FIG. 2

FIFTH GENERATION (5G) AND Wi-Fi MULTI-ACCESS POINT COORDINATION FUNCTION

TECHNICAL FIELD

The present disclosure relates generally to providing a Fifth Generation (5G) and Wi-Fi Multi-Access Point Coordination (MAPc) function.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for providing a 5G and Wi-Fi MAPc function;

DETAILED DESCRIPTION

Overview

Figure 1:
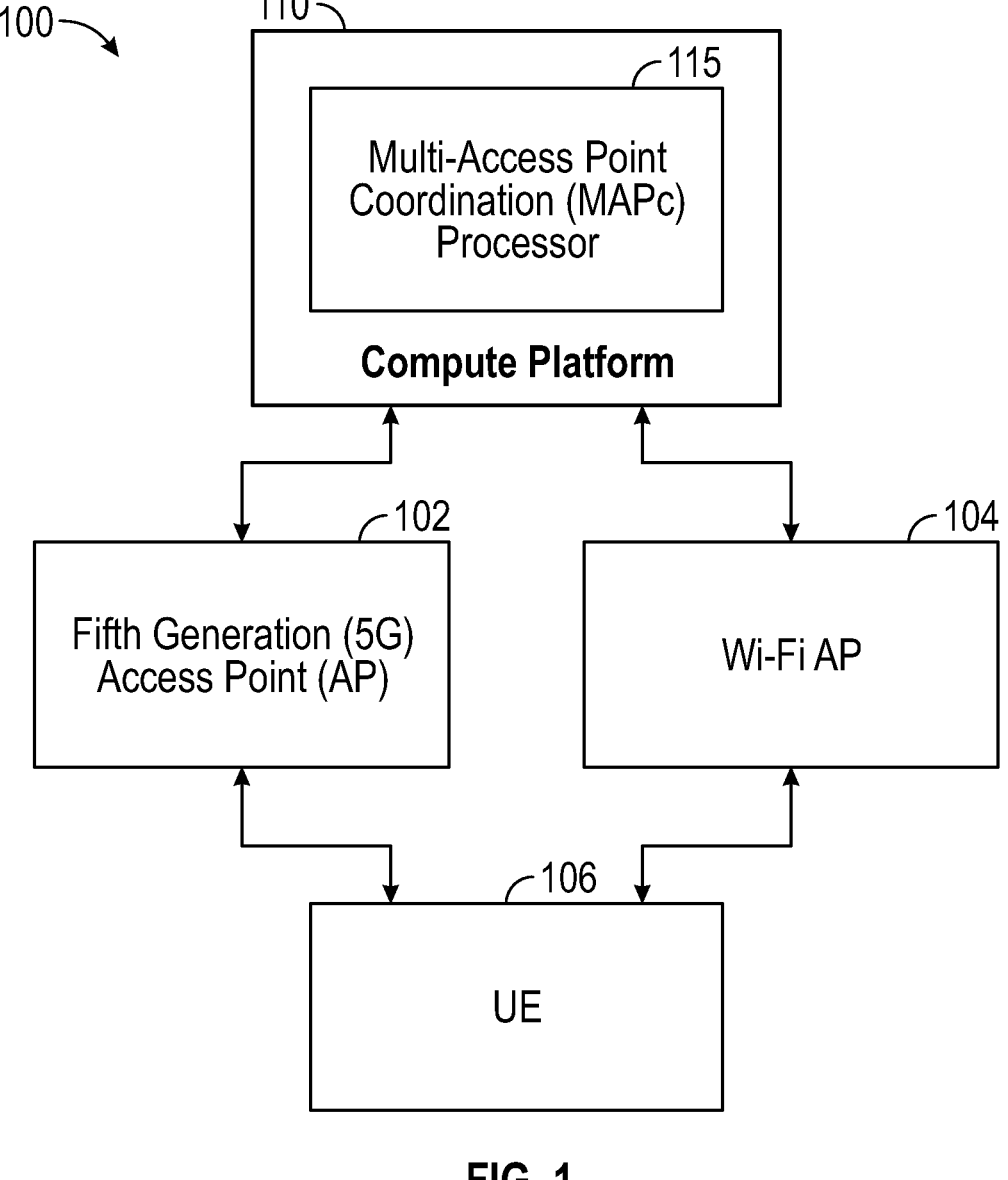
FIG. 1 is a block diagram of an operating environment for providing a 5G and Wi-Fi MAPc function.

A Fifth Generation (5G) and Wi-Fi Multi-Access Point Coordination (MAPc) function may be provided. A MAPc processor may determine a first traffic flow and a second traffic flow for a User Equipment (UE) and a property of the first traffic flow and of the second traffic flow. The MAPc processor may schedule restricted Target Wake Time (rTWT) service intervals on a Wi-Fi AP for the first traffic flow, and the MAPc processor may schedule rTWT service intervals on a 5G AP for the second traffic flow. The rTWT service intervals on the Wi-Fi AP may be at different times than the rTWT service intervals on the 5G AP.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Fifth Generation (5G) services and Wi-Fi services may be independent and without coordination. Thus, there may be co-channel interference between the 5G services and the Wi-Fi services, leading to collisions and sub-optimal network performance. For example, when the 5G service operates on a New Radio Unlicensed (NR-U) band, the 5G service may share the same channels with Wi-Fi Access Points (AP). There may not be enough available channels to provide non-overlapping coverage in high demand environments.

FIG. 1 is a block diagram of an operating environment 100 for providing a and Wi-Fi MAPc function. The operating environment may include a 5G AP 102, a Wi-Fi AP 104, a User Equipment (UE) 106, and a compute platform 110 with a Multi-Access Point Coordination (MAPc) Processor 115. The 5G AP 102, the Wi-Fi AP 104, and the compute platform 110 may all be associated with a network. The 5G AP 102 may be a 5G radio unit, such as a 5G New Radio Unlicensed (NR-U). The UE 106 may be any device associated with a user of the network, such as a personal computer, a mobile device, a tablet, and the like.

The compute platform 110 may be a device located at an edge of the network and/or a Wireless LAN Controller (WLC). The MAPc processor 115 may be a specialized processor or a general processor that is part of the compute platform 110. The MAPc processor 115 may execute a MAPc function. The MAPc processor 115 executing the MAPc function may include scheduling restricted Target Wake Time (rTWT) service intervals for the 5G AP 102 and the Wi-Fi AP 104. The MAPc processor 115 may schedule rTWT service intervals for the 5G AP 102 and the Wi-Fi AP 104 based on the amount, priority, and/or latency of the traffic for the 5G AP 102 and the Wi-Fi AP 104. The priority of the traffic may be based on type of data the traffic is (e.g., video data, voice data, text data).

The MAPc processor 115 may use a near synchronized Buffer Status Report (BSR) trigger mechanism between the Wi-Fi AP 104 and the UE 106 and between the 5G AP 102 and the UE 106 to determine the amount, priority, and/or latency of traffic flows and to schedule the rTWT service intervals. For example, the MAPc processor 115 may use the near synchronized BSR to determine the amount of data available for transmission via the 5G AP 102 and Wi-Fi AP 104. The MAPc processor 115 may determine the amount and times of rTWT service intervals based on the amount of data available for transmission via the 5G AP 102 and the Wi-Fi AP 104. The MAPc processor 115 may initiate the near synchronized BSR trigger mechanism at substantially the same time for the 5G AP 102 and the Wi-Fi AP 104, and the near synchronized BSR for the 5G AP 102 and the Wi-Fi AP 104 may have the same period.

The MAPc processor 115 may dynamically alter the periodicity of the BSR triggers based on monitoring the buffer status and criticality of buffer data reported by the UE 106 on the 5G AP 102 and the Wi-Fi AP 104. The buffer status may include the priority of the data, the queue size, and the depth. For example, if the load of the traffic diminishes and/or only low priority data traffic flows are present, the MAPc processor 115 may reduce the period of the BSR to save air-time. The MAPc processor 115 may also determine the allocation of future rTWT service intervals based on the monitoring of the buffer status and criticality of buffer data reported by the UE 106 on the 5G AP 102 and the Wi-Fi AP 104.

The BSR may also return the current uplink queue size and depth to the MAPc processor 115, and the MAPc processor 115 may combine the uplink queue size and depth with the buffer status for the 5G AP 102 and the Wi-Fi AP 104. Thus, the MAPc processor 115 may store bi-directional client data, data associated with the US 106 for example, for the 5G AP 102 and the Wi-Fi AP 104. The MAPc processor 115 may use the bi-directional data associated with the UE 106 to determine the rTWT schedule for the 5G AP 102 and the Wi-Fi AP 104. The MAPc processor 115 may also use per-Traffic Identifier (TID), per-Quality-of-Service (QoS) Class Identifier (QCI), and/or per-Traffic Flow Template (TFT) information to determine the latency requirements of the traffic flows associated with the UE 106 to determine the rTWT schedule for the 5G AP 102 and the Wi-Fi AP 104.

In an example, the Wi-Fi AP 104 may determine that latency-sensitive traffic is included in the traffic flow associated with the UE 106. The Wi-Fi AP 104 may send a request to the MAPc processor 115 to schedule a rTWT service interval for sending the latency-sensitive traffic. The MAPc processor 115 may schedule the request rTWT service interval based on the amount, priority, and/or latency of the latency-sensitive traffic, other traffic of the Wi-Fi AP 104, and/or traffic of the 5G AP 102. Once the MAPc processor 115 schedules the requested rTWT service interval, the Wi-Fi AP 104 may announce the grant schedule in the rTWT service period for select Stations (STAs) and/or broadcasts (e.g., the UE 106), and the Wi-Fi AP 104 may serve the STA associated with the latency-sensitive traffic, the UE 106 in this example. During the scheduled rTWT service period, the MAPc processor 115 may not schedule the 5G AP 102 serve traffic for the UE 106 to prevent interference.

After a rTWT service period or during a rTWT service period, if the associated AP (e.g., the 5G AP 102, the Wi-Fi AP 104) detects that the scheduled STAs (e.g., the UE 106) have finished transmitting the desired traffic, then the associated AP may terminate the rTWT service period and deregister for rTWT grants from the MAPc processor 115 until the next period. The MAPc processor 115, at the end of the rTWT service period or after the early termination by the associated AP, may coordinate with the 5G AP 102 and/or the Wi-Fi AP 104 to prevent Almost Blank Subframes (ABS) and/or null frames and handle the traffic.

The MAPc processor 115 may use one or more processes to determine the rTWT scheduling for the 5G AP 102 and the Wi-Fi AP 104. For one process, the MAPc processor 115 determine the types of flows supported by the 5G AP 102 and the Wi-Fi AP 104 for a given STA, such as the UE 106. For example, the 5G AP 102 may support QCIs and/or TFTs, and the Wi-Fi AP 104 may support TIDs. The MAPc function may estimate or otherwise determine the downlink and uplink traffic of the 5G AP 102 and the Wi-Fi AP 104 for each traffic flow (e.g., a TID, a CQI) and the average data rate of the traffic flows. The MAPc processor 115 may determine a QoS choice for the rTWT schedule based on the load and the relative traffic priority on the 5G AP 102 and the Wi-Fi AP 104. For example, if the Wi-Fi AP 104 is serving 10 millisecond video flows and the 5G AP 102 is serving a 100 millisecond Internet-of-Things (IoT) control loop from an Autonomous Mobile Robot (AMR), the MAPc processor 115 may determine that the video flows are higher priority and create the rTWT schedule so that service periods for the video flows are allocated first to ensure the flows are served quickly. Similarly, if the Wi-Fi AP 104 is serving bulk IoT data telemetry and the AP 102 is serving the IoT control loop, the MAPc processor 115 may determine that the IoT control loop is higher priority and create the rTWT schedule so that the service periods for IoT control loop are allocated first. The MAPc processor 115 may coordinate the rTWT schedule as described above based on a best traffic flow mapped to each AP, such as the 5G AP 102 and the Wi-Fi AP 104.

The above process may only include the steps described above. The MAPc processor 115 may also use a second process that includes the steps described above and additional steps. The additional steps may include the MAPc processor 115 learning or otherwise being provisioned with the current queue latency (e.g., downlink latency from the 5G AP 102 or the Wi-Fi AP 104, uplink latency from the BSR). The MAPc processor 115 may additionally determine the rTWT schedule to balance choosing a QoS choice for the rTWT schedule that may also minimize the queue latency. For the 10 millisecond video and 100 millisecond IoT control example described above, if the low-latency video is mapped to the Wi-Fi AP 104, but the current downlink latency is over 100 milliseconds, and the 5G AP 102 current latency is less than 10 milliseconds, the MAPc processor 115 may switch the flows for the 5G AP 102 to have an allocated rTWT before the Wi-Fi AP 104 based on the latency.

FIG. 2 is a flow chart of a method 200 for providing a 5G and a Wi-Fi MAPc function. The MAPc function may be executed by the MAPc processor 115. The method 200 may begin at starting block 205 and proceed to operation 210. In operation 210, a first traffic flow and a second traffic flow for a UE may be determined. For example, the MAPc processor 115 may determine a first traffic flow associated with the Wi-Fi AP 104 and a second traffic flow associated with the 5G AP 102.

In operation 220, a property of the first traffic flow and a property of the second traffic flow may be determined, for example, by the MAPc processor 115. The property may be the amount of data of the traffic flow, the priority of the data of the traffic flow, the time needed to transmit the data of the traffic flow, and/or the latency of the traffic flow.

In operation 230, an rTWT service interval on a Wi-Fi AP for the first traffic flow may be scheduled. For example, the MAPc processor 115 may schedule the rTWT service interval on the Wi-Fi AP 104 for the first traffic flow. The rTWT service interval may be scheduled based on the property of the first traffic flow and a property of the second traffic flow determined in operation 220. The MAPc processor 115 may utilize the BSR, the processes, and the other methods described above with respect to FIG. 1 to determine the rTWT service interval. The MAPc processor 115 may schedule multiple rTWT service intervals on the Wi-Fi AP 104 for the first traffic flow.

In operation 240, a rTWT service interval on a 5G AP for the second traffic flow may be scheduled, wherein the rTWT service intervals on the Wi-Fi AP are at different times than the rTWT service intervals on the 5G AP. For example, the MAPc processor 115 may schedule the rTWT service interval on the 5G AP 102 for the second traffic flow. The rTWT service interval may be scheduled based on the property of the first traffic flow and a property of the second traffic flow determined in operation 220. The MAPc processor 115 may utilize the BSR, the processes, and the other methods described above with respect to FIG. 1 to determine the rTWT service interval. The MAPc processor 115 may schedule multiple rTWT service intervals on the 5G AP 102 for the second traffic flow. The method 200 may conclude at ending block 250.

Figure 3:
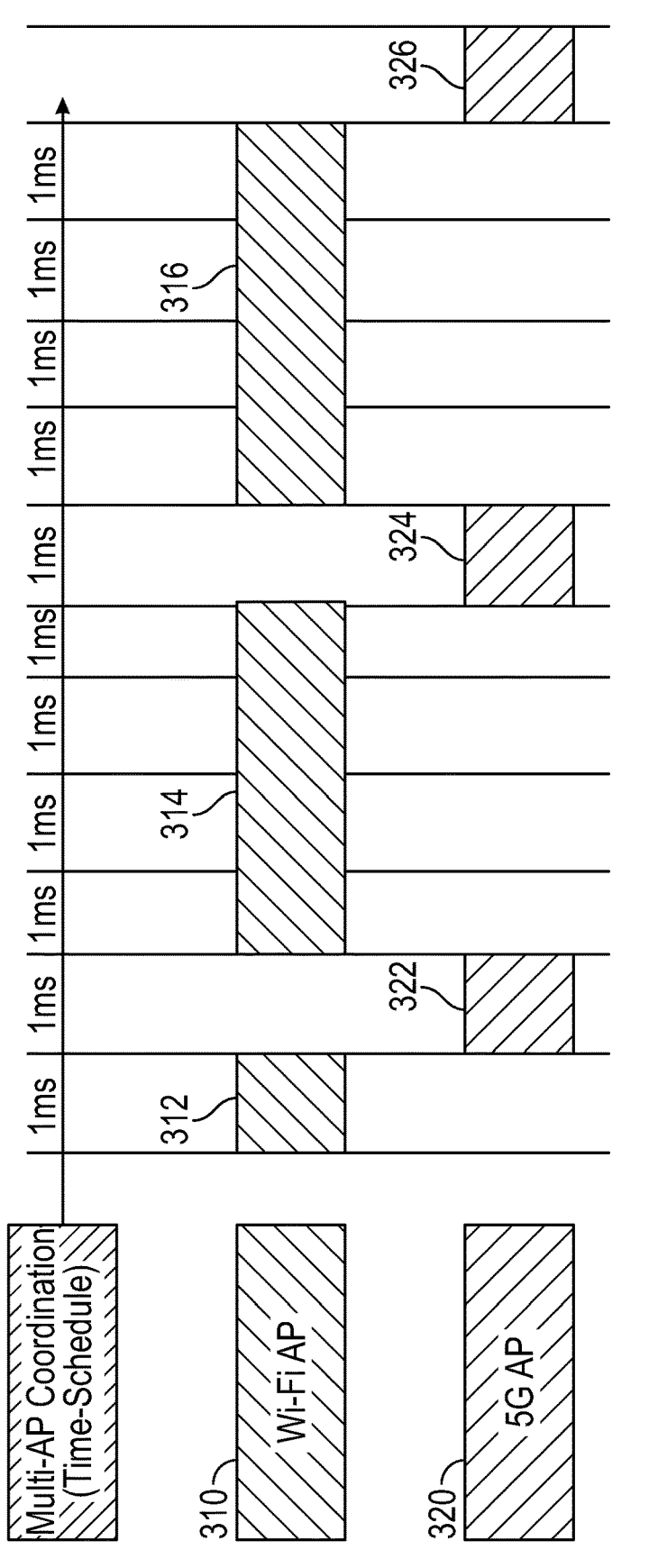
FIG. 3 is a time flow chart of restricted Target Wake Time intervals scheduled by a MAPc processor.

FIG. 3 is a time flow chart 300 of rTWT service intervals scheduled by a MAPc processor, such as the MAPc processor 115. The MAPc processor 115 may schedule rTWT service intervals for the Wi-Fi AP 310 and the 5G AP 320. The MAPc processor 115 scheduled the rTWT service interval 312, the rTWT service interval 314, and the rTWT service interval 316 for the Wi-Fi AP 310. Similarly, the MAPc processor 115 scheduled the rTWT service interval 322, the rTWT service interval 324, and the rTWT service interval 326 for the 5G AP 320. The rTWT service intervals may have different lengths based on the data meant to be transmitted during the interval. For example, the rTWT service interval 312 may have a length of 1 millisecond and the rTWT service interval 314 and the rTWT service interval 316 may have a length of 4 milliseconds. The order of the rTWT service interval may be based on the evaluation, information received from the APs, information received from the BSR, the processes, and other methods described above with respect to FIG. 1. For example, the rTWT service interval 312 may be scheduled first before rTWT service intervals of the 5G AP 320 based on the properties of the traffic flows of the Wi-Fi AP 310 and the traffic flows of the 5G AP 320.

Figure 4:
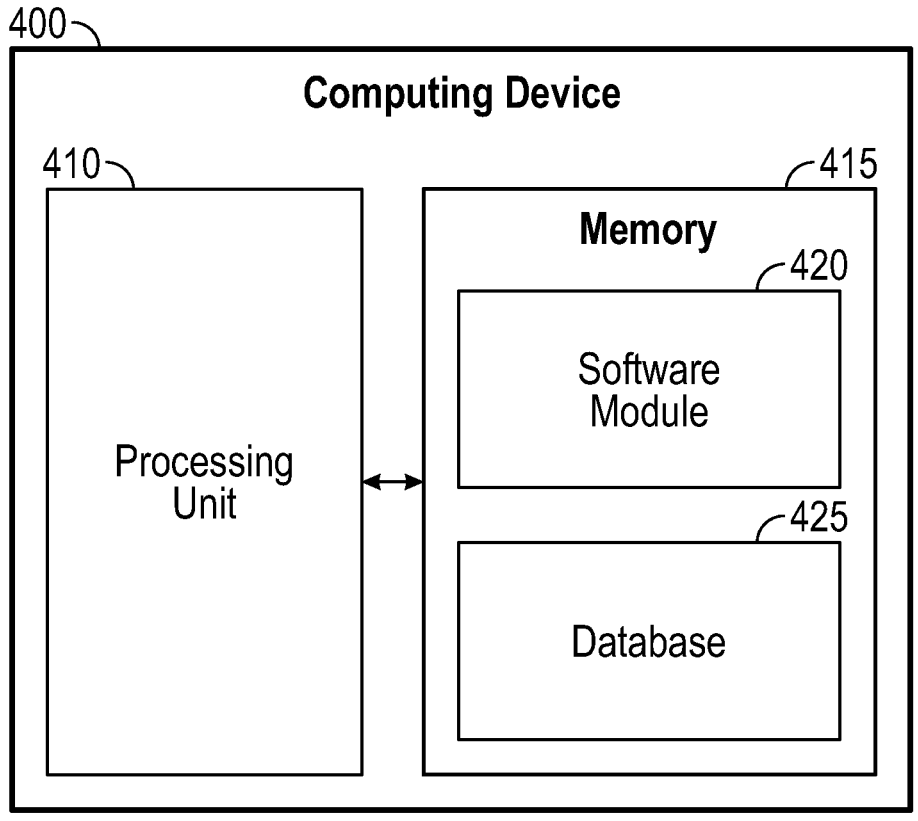
FIG. 4 is a block diagram of a computing device.

FIG. 4 is a block diagram of a computing device. As shown in FIG. 4, computing device 400 may include a processing unit 410 and a memory unit 415. Memory unit 415 may include a software module 420 and a database 425. While executing on processing unit 410, software module 420 may perform, for example, processes for providing a 5G and Wi-Fi MAPc function as described above with respect to FIG. 1, FIG. 2, and FIG. 3. Computing device 400, for example, may provide an operating environment for the 5G AP 102, the Wi-Fi AP 104, the UE 106, the compute platform 110, the MAPc processor 115, the Wi-Fi AP 310, the 5G AP 320, and/or any other system described herein. The 5G AP 102, the Wi-Fi AP 104, the UE 106, the compute platform 110, the MAPc processor 115, the Wi-Fi AP 310, the 5G AP 320, and/or any other system described herein may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
determining, by a Multi-Access Point Coordination (MAPc) processor, a first traffic flow via a Wireless Fidelity (Wi-Fi) Access Point (AP) for a User Equipment (UE);
determining, by the MAPc processor, a second traffic flow via a 5th Generation (5G) AP for the UE;
determining, by the MAPc processor, a property of the first traffic flow via the Wi-Fi AP for the UE and of the second traffic flow via the 5G AP for the UE;
scheduling, by the MAPc processor, first restricted Target Wake Time (rTWT) service intervals on the Wi-Fi AP for the first traffic flow via the Wi-Fi AP for the UE;
scheduling, by the MAPc processor, second rTWT service intervals on the 5G AP for the second traffic flow via the 5G AP for the UE, wherein the first rTWT service intervals on the Wi-Fi AP are at different times than the second rTWT service intervals on the 5G AP;
initiating, by the MAPc processor, a near synchronized Buffer Status Report (BSR) trigger mechanism between the Wi-Fi AP and the UE and between the 5G AP and the UE.

2. The method of claim 1, wherein the 5G AP is a 5G New Radio Unlicensed AP.

3. The method of claim 1, wherein the property of the first traffic flow and of the second traffic flow includes at least one of (i) an amount of data of the first traffic flow, (ii) an amount of data of the second traffic flow, (iii) a priority of data of the first traffic flow, (iv) a priority of data of the second traffic flow, (v) a time needed to transmit data of the first traffic flow, (vi) a time needed to transmit data of the second traffic flow, (vii) a latency of the first traffic flow, (viii) a latency of the second traffic flow, and (iv) any combination of (i)-(viii).

4. The method of claim 1, wherein determining the property of the first traffic flow and of the second traffic flow is based on information returned by the BSR.

5. The method of claim 1, further comprising determining, by the MAPc processor, a latency of the first traffic flow and of the second traffic flow.

6. The method of claim 5, wherein scheduling the first rTWT service intervals on the Wi-Fi AP for the first traffic flow and the second rTWT service intervals on the 5G AP for the second traffic flow are based on reducing the latency of the first traffic flow and of the second traffic flow.

7. A system comprising:
a memory storage; and
a processing unit coupled to the memory storage, wherein the processing unit is operative to:
determine, by a Multi-Access Point Coordination (MAPc) processor, a first traffic flow via a Wireless Fidelity (Wi-Fi) Access Point (AP) for a User Equipment (UE);
determine, by the MAPc processor, a second traffic flow via a 5th Generation (5G) AP for the UE;
determine, by the MAPc processor, a property of the first traffic flow via the Wi-Fi AP for the UE and of the second traffic flow via the 5G AP for the UE;
schedule, by the MAPc processor, first restricted Target Wake Time (rTWT) service intervals on the Wi-Fi AP for the first traffic flow via the Wi-Fi AP for the UE;
schedule, by the MAPc processor, second rTWT service intervals on the 5G AP for the second traffic flow via the 5G AP for the UE, wherein the first rTWT service intervals on the Wi-Fi AP are at different times than the second rTWT service intervals on the 5G AP;
initiate, by the MAPc processor, a near synchronized Buffer Status Report BSR) trigger mechanism between the Wi-Fi AP and the UE and between the 5G AP and the UE.

8. The system of claim 7, wherein the 5G AP is a 5G New Radio Unlicensed AP.

9. The system of claim 7, wherein the property of the first traffic flow and of the second traffic flow includes at least one of (i) an amount of data of the first traffic flow, (ii) an amount of data of the second traffic flow, (iii) a priority of data of the first traffic flow, (iv) a priority of data of the second traffic flow, (v) a time needed to transmit data of the first traffic flow, (vi) a time needed to transmit data of the second traffic flow, (vii) a latency of the first traffic flow, (viii) a latency of the second traffic flow, and (iv) any combination of (i)-(viii).

10. The system of claim 7, wherein to determine the property of the first traffic flow and of the second traffic flow is based on information returned by the BSR.

11. The system of claim 7, wherein the processing unit is further operative to determine, by the MAPc processor, a latency of the first traffic flow and of the second traffic flow, wherein to schedule the first rTWT service intervals on the Wi-Fi AP for the first traffic flow and the second rTWT service intervals on the 5G AP for the second traffic flow are based on reducing the latency of the first traffic flow and of the second traffic flow.

12. A non-transitory computer-readable medium that stores a set of instructions which when executed perform a method executed by the set of instructions comprising:

determining, by a Multi-Access Point Coordination (MAPc) processor, a first traffic flow via a Wireless Fidelity (Wi-Fi) Access Point (AP) for a User Equipment (UE);

determining, by the MAPc processor, a second traffic flow via a 5th Generation (5G) AP for the UE;

determining, by the MAPc processor, a property of the first traffic flow via the Wi-Fi AP for the UE and of the second traffic flow via the 5G AP for the UE;

scheduling, by the MAPc processor, first restricted Target Wake Time (rTWT) service intervals on the Wi-Fi AP for the first traffic flow via the Wi-Fi AP for the UE;

scheduling, by the MAPc processor, second rTWT service intervals on the 5G AP for the second traffic flow via the 5G AP for the UE, wherein the first rTWT service intervals on the Wi-Fi AP are at different times than the second rTWT service intervals on the 5G AP;

initiating, by the MAPc processor, a near synchronized Buffer Status Report (BSR) trigger mechanism between the Wi-Fi AP and the UE and between the 5G AP and the UE.

13. The non-transitory computer-readable medium of claim 12, wherein the 5G AP is a 5G New Radio Unlicensed AP.

14. The non-transitory computer-readable medium of claim 12, wherein the property of the first traffic flow and of the second traffic flow includes at least one of (i) an amount of data of the first traffic flow, (ii) an amount of data of the second traffic flow, (iii) a priority of data of the first traffic flow, (iv) a priority of data of the second traffic flow, (v) a time needed to transmit data of the first traffic flow, (vi) a time needed to transmit data of the second traffic flow, (vii) a latency of the first traffic flow, (viii) a latency of the second traffic flow, and (iv) any combination of (i)-(viii).

15. The non-transitory computer-readable medium of claim 12, wherein determining the property of the first traffic flow and of the second traffic flow is based on information returned by the BSR.

16. The non-transitory computer-readable medium of claim 12, further comprising determining, by the MAPc processor, a latency of the first traffic flow and of the second traffic flow.

17. The non-transitory computer-readable medium of claim 16, wherein scheduling the first rTWT service intervals on the Wi-Fi AP for the first traffic flow and the second rTWT service intervals on the 5G AP for the second traffic flow are based on reducing the latency of the first traffic flow and of the second traffic flow.

* * * * *